US008681164B2

(12) United States Patent
Owen et al.

(10) Patent No.: US 8,681,164 B2
(45) Date of Patent: *Mar. 25, 2014

(54) ELECTRONIC SYSTEM AND METHOD FOR SELECTIVELY ALLOWING ACCESS TO A SHARED MEMORY

(71) Applicant: STMicroelectronics, Inc., Coppell, TX (US)

(72) Inventors: Jefferson Eugene Owen, Fremont, CA (US); Raul Zegers Diaz, Palo Alto, CA (US); Osvaldo Colavin, Tucker, GA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/655,152

(22) Filed: Oct. 18, 2012

(65) Prior Publication Data

US 2013/0042072 A1    Feb. 14, 2013

Related U.S. Application Data

(63) Continuation of application No. 13/239,200, filed on Sep. 21, 2011, now Pat. No. 8,314,808, which is a (Continued)

(51) Int. Cl.
*G06F 13/18* (2006.01)
*G06F 15/167* (2006.01)

(52) U.S. Cl.
USPC .......................................... 345/535; 345/541

(58) Field of Classification Search
USPC ..................... 345/541, 535, 542, 547, 555
See application file for complete search history.

(56) References Cited

U.S. PATENT DOCUMENTS 4,257,095 A    3/1981  Nadir ........................... 710/119
4,774,660 A    9/1988  Conforti ....................... 364/200

(Continued)

FOREIGN PATENT DOCUMENTS

CA    2100700    1/1995
DE    69631364   11/2004

(Continued)

OTHER PUBLICATIONS

Accelerated Graphics Port Interface Specification, Revision 1.0, Intel Corporation, Jul. 31, 1996.*

(Continued)

*Primary Examiner* — Hau Nguyen
(74) *Attorney, Agent, or Firm* — Seed IP Law Group PLLC

(57) ABSTRACT

An electronic system, an integrated circuit and a method for display are disclosed. The electronic system contains a first device, a memory and a video/audio compression/decompression device such as a decoder/encoder. The electronic system is configured to allow the first device and the video/audio compression/decompression device to share the memory. The electronic system may be included in a computer in which case the memory is a main memory. Memory access is accomplished by one or more memory interfaces, direct coupling of the memory to a bus, or direct coupling of the first device and decoder/encoder to a bus. An arbiter selectively provides access for the first device and/or the decoder/encoder to the memory based on priority. The arbiter may be monolithically integrated into a memory interface. The decoder may be a video decoder configured to comply with the MPEG-2 standard. The memory may store predicted images obtained from a preceding image.

17 Claims, 6 Drawing Sheets

Related U.S. Application Data

(63) continuation of application No. 13/015,385, filed on Jan. 27, 2011, now Pat. No. 8,054,315, which is a continuation of application No. 12/857,455, filed on Aug. 16, 2010, now Pat. No. 7,898,548, which is a continuation of application No. 12/424,389, filed on Apr. 15, 2009, now Pat. No. 7,777,753, which is a continuation of application No. 11/956,165, filed on Dec. 13, 2007, now Pat. No. 7,542,045, which is a continuation of application No. 10/174,918, filed on Jun. 19, 2002, now Pat. No. 7,321,368, which is a continuation of application No. 09/539,729, filed on Mar. 30, 2000, now Pat. No. 6,427,194, which is a continuation of application No. 08/702,910, filed on Aug. 26, 1996, now Pat. No. 6,058,459.

(56) References Cited

U.S. PATENT DOCUMENTS

| | | | | |
|---|---|---|---|---|
| 4,894,565 | A | 1/1990 | Marquardt | 307/518 |
| 5,027,400 | A | 6/1991 | Baji et al. | 380/20 |
| 5,212,742 | A | 5/1993 | Normile et al. | 382/166 |
| 5,250,940 | A | 10/1993 | Valentaten et al. | 345/189 |
| 5,363,500 | A | 11/1994 | Takeda | 395/425 |
| 5,371,893 | A | 12/1994 | Price et al. | 395/725 |
| 5,450,542 | A | 9/1995 | Lehman et al. | 395/162 |
| 5,459,519 | A | 10/1995 | Scalise et al. | 348/431.1 |
| 5,461,679 | A | 10/1995 | Normile et al. | 283/304 |
| 5,522,080 | A | 5/1996 | Harney | 395/727 |
| 5,546,547 | A * | 8/1996 | Bowes et al. | 710/114 |
| 5,557,538 | A | 9/1996 | Retter et al. | 364/514 A |
| 5,576,765 | A | 11/1996 | Cheney et al. | 348/407 |
| 5,579,052 | A | 11/1996 | Artieri | 348/416 |
| 5,590,252 | A | 12/1996 | Silverbrook | 395/133 |
| 5,598,525 | A | 1/1997 | Nally et al. | 395/162 |
| 5,621,893 | A | 4/1997 | Joh | 395/200.02 |
| 5,623,672 | A | 4/1997 | Popat | 395/728 |
| 5,682,484 | A | 10/1997 | Lambrecht | 710/128 |
| 5,748,203 | A | 5/1998 | Tang et al. | 345/521 |
| 5,771,358 | A * | 6/1998 | LaBerge | 710/107 |
| 5,774,206 | A | 6/1998 | Wasserman et al. | 395/200.77 |
| 5,774,676 | A | 6/1998 | Stearns et al. | 709/247 |
| 5,778,096 | A | 7/1998 | Stearns | 382/233 |
| 5,793,384 | A | 8/1998 | Okitsu | 345/535 |
| 5,797,028 | A | 8/1998 | Gulick et al. | 395/800.32 |
| 5,805,921 | A * | 9/1998 | Kikinis et al. | 710/2 |
| 5,809,245 | A | 9/1998 | Zenda | 345/204 |
| 5,809,538 | A | 9/1998 | Pollmann et al. | 711/151 |
| 5,812,789 | A | 9/1998 | Diaz et al. | 709/247 |
| 5,812,800 | A * | 9/1998 | Gulick et al. | 710/306 |
| 5,815,167 | A | 9/1998 | Muthal | 345/541 |
| 5,835,082 | A | 11/1998 | Perego | 345/202 |
| 5,912,676 | A | 6/1999 | Malladi et al. | 345/521 |
| 5,923,665 | A | 7/1999 | Sun et al. | 370/477 |
| 5,936,616 | A | 8/1999 | Torborg, Jr. et al. | 345/202 |
| 5,960,464 | A | 9/1999 | Lam | 711/202 |
| 5,977,947 | A * | 11/1999 | Potu | 345/660 |
| 6,058,459 | A | 5/2000 | Owen et al. | 711/151 |
| 6,297,832 | B1 | 10/2001 | Mizuyabu et al. | 345/540 |
| 6,330,644 | B1 | 12/2001 | Yamashita et al. | 711/147 |

FOREIGN PATENT DOCUMENTS

| | | |
|---|---|---|
| EP | 0 639 032 | 7/1994 |
| EP | 0 673 171 | 9/1995 |
| EP | 0 495 574 | 3/1997 |
| EP | 0827110 | 3/1998 |
| EP | 0827348 | 3/1998 |
| EP | 0 710 029 | 3/2002 |
| EP | 0772159 | 1/2004 |
| FR | 2740583 | 4/1997 |
| JP | 06-030442 | 2/1994 |
| JP | 06-178274 | 6/1994 |
| JP | 06-348238 | 12/1994 |
| JP | 08-018953 | 1/1996 |
| JP | 10-108117 | 4/1998 |
| JP | 10-145739 | 5/1998 |
| WO | 96/20567 | 7/1996 |

OTHER PUBLICATIONS

Ackland, "The Role of VLSI in Multimedia," *IEEE Journal of Solid-State Circuits*, Apr. 1994, vol. 29, No. 4, pp. 381-388.

Adam et al, "The Vidboard: A Video Capture and Processing Peripheral for a Distributed Multimedia System," *ACM Multimedia*, Aug. 1-6, 1993, vol. 5, No. 2, pp. 113-120.

Adiletta, et al., "Architecture of a Flexible Real-Time Video Encoder/Decoder: The DECchip 21230," *Multimedia Hardware Architectures 1997*, Feb. 12-13, 1997, vol. 3021, pp. 136-148.

Apple Macintosh Quadra 840AV when executing the "Fusionrecorder 1.0" application as described in the 1993 Developer Note entitled Macintosh Quadra 840AV and Macintosh Centris 660AV Computers.

Araki, et al., "Video DSP Architecture for MPEG2 CODEC," *ICASSP-94 S₂AUVN, Speech Processing 2, Audio, Underwater Acoustics, VLSI & Neural Networks*, Apr. 19-22, 1994, vol. 2, pp. 417-420.

Bailey et al., "Programmable Vision Processor/Controller for Flexible Implementation of Current and Future Image Compression Standards," *IEEE Micro*, Oct. 1992, pp. 33-39.

Bao et al., "OCP_A: An Efficient QoS Control Scheme for Real Time Multimedia Communications," *IEEE Global Telecommunications Conference*, Conference Record, Nov. 3-8, 1997, vol. 2 of 3, pp. 741-745.

Baugher, "The OS/2 Resource Reservation System," *Multimedia Computing and Networking 1995*, Feb. 1995, vol. 2417, pp. 167-176.

Baum et al., "A Multimedia Chipset for Consumer Audio-Visual Applications," *IEEE Transactions on Consumer Electronics*, Aug. 1997, vol. 43, No. 3, pp. 646-648.

Bhaskaran et al., "Multimedia Architectures: From Desktop Systems to Portable Appliances," *Multimedia Hardware Architectures 1997*, Feb. 12-13, 1997, vol. 3021, pp. 14-25.

Bhed et al., "A High-Performance Cross-Platform MPEG Decoder," *Digital Video Compression on Personal Computers: Algorithms and Technologies*, SPIE Proceedings, Feb. 7-8, 1994, vol. 2187, pp. 241-248.

Bonannon et al., "The Architecture of the Dali Main-Memory Storage Manager," *Multimedia Tools and Applications*, 1997, vol. 4, pp. 115-151.

Bouville et al., "DVFLEX: A Flexible MPEG Real Time Video CODEC," *International Conference on Image Processing*, Sep. 16-19, 1996, vol. II of III, pp. 829-832.

Bove, Jr., "The Impact of New Multimedia Representations on Hardware and Software Systems," *Multimedia Hardware Architectures 1997*, Feb. 12-13, 1997, vol. 3021, pp. 34-39.

Brahmbatt, "A VLSI Architecture for Real Time Code Book Generator and Encoder of a Vector Quantizer," *International Conference on Image Processing*, IEEE Signal Processing Society, vol. 2, Sep. 16-19, 1996, pp. 991-994.

Bursky, "Codec Compresses Images in Real Time: Real-Time Motion Video or Still Images Can be Compressed with Single-Chip Multistandard Core," *Electronic Design*, Oct. 3, 1993.

Bursky, "Highly Integrated Controller Eases MPEG-2 Adoption," *Electronic Design*, vol. 43, No. 17, pp. 141-142, Aug. 21, 1995.

Bursky, "Performing Over 8 BOPS, A Two Chip Set Can Compress or Expand Video in Real Time Image Processing Chip Set Handles Full Motion Video," *Electronic Design*, May 3, 1993.

Butler et al., "The Great Leap Forward," *PC Magazine*, pp. 241-244, 246, 248, 250, 253-254, 256, 260-261, 264, 266-268, 273-275, 278, Oct. 11, 1994.

C-Cube CL450 MPEG Video Decoder ("CL450") as described in the "CL450 MPEG Decoder User's Manual," C-Cube Microsystems, Milpitas, CA 1992 (MOT-S 721789-721874).

Chaddha et al., "A Real-Time Scalable Color Quantizer Trainer/Encoder," *The Twenty-Eighth Asilomar Conference on Signals, Systems & Computers*, Oct. 30-Nov. 2, 1994, pp. 203-207.

(56) References Cited

OTHER PUBLICATIONS

Chang et al., "Columbia's VoD and Multimedia Research Testbed with Heterogeneous Network Support," *Multimedia Tools and Applications*, 1997, vol. 5, pp. 171-184.
Chaudhry et al., "A Framework for Analysis of Guaranteed QOS Systems," *Video Techniques and Software for Full-Service Networks*, Nov. 21, 1996, vol. 2915, pp. 25-38.
Chen et al., "Video Encoder Architecture for MPEG2 Real Time Encoding," *IEEE Transactions Consumer Electronics*, Aug. 1996, vol. 42, No. 3, pp. 290-299.
Cheng et al., "Disk Management for a Hard Real-Time File System," *Multimedia Systems*, vol. 4, No. 2, 1996, pp. 255-260.
Chiariglione, "MPEG: A Technological Basis for Multimedia Applications," *Multimedia*, Spring 1995, vol. 2, No. 1.
Choe et al., "ATM-Based Multi-Party Conferencing System," *IEEE Global Telecommunications Conference*, Nov. 1995, vol. 1 of 3, pp. 592-596.
Colaitis, "Opening Up Multimedia Object Exchange with MHEG," *Multimedia*, Summer 1994, vol. 2, No. 2.
Coulson et al., "The Design of a QoS-Controlled ATM-Based Communications System in Chorus," *IEEE Journal on Selected Areas in Communications*, May 1995, vol. 13, No. 4, pp. 686-699.
Deka, "A Comprehensive Study of Digital Signal Processing Devices," *Microprocessors and Microsystems*, May 1995, vol. 19, No. 4, pp. 209-221.
Demairy et al., "On the Correctness of Multimedia Applications," *The 11th Euromicro Conference on Real-Time Systems*, IEEE Computer Society, Jun. 9-11, 1999, pp. 226-233.
Doquilo "Symmetric Multiprocessing Servers: Scaling the Performance Wall," *Infoworld*, pp. 82-85, 88-92, Mar. 27, 1995.
Dusen et al., "From Concept to an Implementation," *International Broadcasting Convention*, Sep. 12-16, 1996.
Dutta et al., "VLSI Issues in Memory-System Design for Video Signal Processors," *IEEE* 1995, pp. 498-503.
Furht, "Multimedia Systems: An Overview," *Multimedia*, Sprin 1994, vol. 1, No. 1, pp. 47-59.
Furht, "Processor Architectures for Multimedia: A Survey," *Multimedia Modeling*, Nov. 17-20, 1997, pp. 89-109.
Galbi et al., "An MPEG-1 Audio/Video Decoder with Run-Length Compressed Antialiased Video Overlays," *IEEE International Solid State Circuits Conference*, pp. 286-287, 381, 1995.
Ganesan, "A Dual-DSP Microprocessor System for Real-Time Digital Correlation," *Microprocessors and Microsystems*, Sep. 1991, vol. 15, No. 7, pp. 29-37.
Ganesan, "A Dual-DSP Microprocessor System for Real-Time Digital Correlation," *Microprocessors and Microsystems*, vol. 15, No. 7, Sep. 1991, pp. 379-384.
Gass, "Architecture Trends of MPEG Decoders for Set-Top Box," *Multimedia Hardware Architectures 1997*, Feb. 12-13, 1997, vol. 3021, pp. 162-169.
Giorgis, "SMP Network Operating Systems," *Computer Dealer News*, vol. 12, No. 16, Aug. 8, 1996.
Goodenough et al., "A General Purpose, Single Chip Video Signal Processing (VSP) Architecture for Image Processing, Coding and Computer Vision," *IEEE* 1994, pp. 1-4.
Goodenough et al., "A Single Chip Video Signal Processing Architecture for Image Processing, Coding and Computer Vision," *IEEE Transaction on Circuits and Systems for Video Technology*, Oct. 1995, vol. 5, No. 5, pp. 436-445.
Gove et al., "Image Computing Requirements for the 1990s: From Multimedia to Medicine," *The International Society for Optical Engineering, Medical Imaging V: Image Capture, Formatting and Display*, Feb. 1991, vol. 1444, pp. 318-333.
Gove, "The MVP: A Highly-Integrated Video Compression Chip," *DCC '94, Data Compression Conference*, Mar. 29-31, 1994, pp. 215-224.
Green, "Capturing Digital Video Using DVI, Multimedia and the i750 video processor," *Dr. Dobb's Journal*, Jul. 1992, vol. 17, Issue 7.

Gruger et al., "MPEG-1 Low-Cost Encoder Solution," *Europe Series, Advanced Image and Video Communications and Storage Technologies*, Mar. 20-23, 1995, vol. 2451, pp. 41-51.
Guediri et al., "An Affordable Solution to Real-Time Video Compression," *Technical Conference, Session 10 Imaging & HDTV*, Mar. 8, 1995, pp. 261-265.
Guttag et al., "A Single-Chip Multiprocessor for Multimedia: The MVP," *IEEE Computer Graphics and Applications*, Nov. 1992, pp. 53-64.
Hoffner et al., "Communication between two microprocessors through common memory," *Microprocessors and Microsystems*, Jul./Aug. 1982, vol. 6, No. 6, pp. 303-308.
Huang et al., "On Supporting Mission-Critical Multimedia Applications," *International Conference on Multimedia Computing and Systems*, Jun. 17-23, 1996, pp. 46-53.
Huang et al., "Resource Management for Continuous Multimedia Database Applications," *Real-Time Systems Symposium*, Dec. 7-9, 1994, pp. 46-54.
Huynh et al., "Performance Analysis of Advanced I/O Architectures for PC-based Video Servers," *Multimedia Systems*, vol. 2, No. 1, 1994, pp. 36-50.
Irvin et al., "A New Generation of MPEG-2 Video Encoder ASIC & ITS Application to New Technology Markets," *International Broadcasting Convention*, Sep. 12-16, 1996, Pub. No. 428.
Jain et al., "An Integrated Circuit Design for Pruned Tree Search Vector Quantization Encoding with an Off-Chip Controller," *IEEE Transactions on Circuit and Systems for Video Technology*, Jun. 1992, vol. 2, No. 2, pp. 147-158.
Kassim et al., "A DSP-Based Video Compression Test-Bed," *Microprocessors and Microsystems*, vol. 20, 1997, pp. 541-551.
Kanellopoulos et al., "The Comprehensive Approach of QOS and the Evolution of ACSE Protocols in Multimedia Communications," *Proceedings of the Third IEEE International Conference on Electronics, Circuits, and Systems*, Oct. 13-16, 1996, vol. 1, pp. 323-326.
Kettler et al., "Scheduling Analysis of the Micro Channel Architecture for Multimedia Applications," *International Conference on Multimedia Computing and Systems*, May 14-19, 1994, pp. 403-414.
Khayat et al., "A Proposed Bus Arbitration Scheme for Multimedia Workstations," *International Conference on Multimedia Computing and Systems*, May 14-19, 1994, pp. 415-423.
Kim et al., "A Real-Time MPEG Encoder Using a Programmable Processor," *IEEE*, 1994, pp. 161-170.
King, *Inside Windows 95*, Microsoft Press, Redmond Washington, pp. 85-90, 1994.
Kinugasa et al., "A Video Pre/Post-processing LSI for Video Capture," *1996 Digest of Technical Papers*, Jun. 5-7, 1996, pp. 396-397.
Kohiyama et al., "Architecture of MPEG-2 Digital Set-Top-Box for CATV Vod System," *IEEE*, 1996, pp. 667-672.
Koinuma et al., "ATM in B-ISDN Communication Systems and VLSI Realization," *IEEE Journal of Solid-State Circuits*, Apr. 1995, vol. 30, No. 4, pp. 341-347.
Kondo et al., "Two-Chip MPEG-2 Video Encoder," *IEEE Micro*, Apr. 1996, vol. 16, No. 2, pp. 51-58.
Lau et al., "A Novel Video-On-Demand Storage Architecture for Supporting Constant Frame Rate with Variable Bit Rate Retrieval," *Network and Operating Systems Support for Digital Audio and Video*, Apr. 19-21, 1995, pp. 294-305.
Lee et al., "MediaStation 5000: Integrating Video and Audio," *Multimedia*, Summer 1994, vol. 1, No. 2, pp. 50-61.
Lee et al., "Real-Time MPEG Video Compression Using the MVP," *Data Compression Conference '94*, Mar. 29-31, 1994.
Lin et al., "Low Power Design for MPEG-2 Video Decoder," *IEEE Transactions on Consumer Electronics*, Aug. 1996, vol. 42, No. 3, pp. 513-521.
Lin and Chein-WeiJen, "On the Bus Arbitration for MPEG2 Video Decoder," *VLSI Tech, Systems and Appl. 1995 Symposium*, pp. 201-205.
Lin et al., "DMA-based Communications between PC and DSP," *Microprocessors and Microsystems*, Apr. 1991, vol. 15, No. 3, pp. 137-142.

(56) References Cited

OTHER PUBLICATIONS

Lisa et al., "A Reconfigurable Coprocessor for a PCI-based Real Time Computer Vision System," *Field-Programmable Logic and Applications*, 7th International Workshop, FPL 1997, London, UK, Sep. 1-3, 1997, pp. 392-399.

Liu, "MPEG Decoder Architecture for Embedded Applications," *IEEE Transactions on Consumer Electronics*, Nov. 1996, vol. 42, No. 4, pp. 1021-1028.

Majeed, "Dual Processor Automotive Controller," *IEEE*, 1988, pp. 39-44.

Maturi, "Single Chip MPEG Audio Decoder, "*IEEE Transactions on Consumer Electronics*, vol. 38, No. 3, pp. 348-356, Aug. 1992.

Matsuo et al., "A Programmable Video Codec System for Low-Bit-Rate Communication," *IEEE Transactions on Consumer Electronics*, Aug. 1997, vol. 43, No. 3, pp. 903-910.

Miura et al., "A 600 mW Single Chip MPEG2 Video Decoder," *IEICE Trans. Electrono*, Dec. 1995, vol. E78-C, No. 12, pp. 1691-1696.

Morton, "A236 Parallel DSP Chip Provides Real-Time Video Processing Economically and Efficiently," *Electro '96 Professional Program Proceedings*, Apr. 30-May 2, 1996, pp. 261-268.

"MPEG Video Overview," *SGS-Thomson Microelectronics Technical Note*, pp. 1-4, 1992.

Ng et al., "An analysis of buffer sharing and prefetching techniques for multimedia systems," *Multimedia Systems*, vol. 4, No. 2, 1996, pp. 55-69.

Ngai et al., "A Scalable Chip Set for MPEG2 Real-Time Encoding," *CompCon*, 1996, pp. 193-198.

Ngoh et al., "On Storage Server Issues for Multimedia-on-Demand System," *Multimedia Modeling*, Nov. 1995, pp. 393-409.

Oliver et al., "Distributed Connection Management for Real-Time Multimedia Services," *From Multimedia Services to Network Services*, Dec. 1997, pp. 59-74.

Ooi et al., "A PC-Based MPEG Compressed Data Decoder," *IEEE Transactions on Consumer Electronics*, Nov. 1995, vol. 41, No. 4, pp. 1169-1173.

Ooi et al., "An MPEG-2 Encoder Architecture Based on a Single Chip Dedicated LSI with a Control MPU," *IEEE*, 1997, pp. 599-602.

Ozden et al., "On the Design of a Low-Cost Video-on-Demand Storage System," *IEEE Journal of Solid State Circuits*, Apr. 1994, vol. 29, No. 4, pp. 40-54.

Shah, "Multimedia on the Internet," *The Twentieth Annual International Computer Software & Applications Conference*, Aug. 21-23, 1996, p. 150.

Pancha et al., "Bandwidth-Allocation Schemes for Variable-Bit-Rate MPEG Sources in ATM Networks," *IEEE Transactions on Circuits and Systems for Video Technology*, Jun. 1993, vol. 3, No. 3, pp. 190-198.

Pillai, "Multimedia Over the Internet," *The Twentieth Annual International Computer Software & Applications Conference*, Aug. 21, 23, 1996, p. 149.

Pirsch et al., "Architectural Approaches for Multimedia Processors," *Multimedia Hardware Architectures 1997*, Feb. 12-13, 1997, vol. 3021, pp. 2-13.

Pirsch et al., "VLSI Architectures for Video Compression—A Survey," *Proceedings of the IEEE*, Feb. 1995, vol. 83, No. 2, pp. 220-246.

Pirsch et al., "VLSI Architectures for Video Signal Processing," *Image Processing and its Applications*, Jul. 4-6, 1995, Conference Publication No. 410, pp. 6-10.

Plansky, "Variable Block-Size Vector Quantization in the Transform Domain," *Signal Processing VI Theories and Applications*, vol. III, 1992, pp. 1243-1246.

Rangan et al., "Designing an On-Demand Multimedia Service," *IEEE Communications Magazine*, Jul. 1992, vol. 30, No. 7, pp. 56-64.

Reddaway, "Fractal Graphics and Image Compression on a DAP," *The Design and Application of Parallel Digital Processors*, Apr. 11-15, 1988, p. 201.

Richard et al., "The Washington University Broadband Terminal," *IEEE Journal on Selected Areas in Communications*, Feb. 1993, vol. 11, No. 2, pp. 276-282.

Richard et al., "The Washington University Multimedia System," *Multimedia Systems*, vol. 1, No. 3, 1993, pp. 120-131.

Rooholamini et al., "ATM-Based Multimedia Servers," *Multimedia*, Spring 1995, vol. 2, No. 1, pp. 39-52.

Russell, "The Challenge of VLSI Technology to Low-bit-rate Video," *International Symposium on VLSI Technology Systems and Applications*, IEEE, Taipei, Taiwan, May 17-19, 1989, 164-168.

Sabaa et al., "Design and Modelling of a Nonblocking Input Buffer ATM Switch," *Can. J. Elect. & Comp. Eng.*, vol. 22, Nov. 3, 1997, pp. 87-93.

Seed et al., "An Enhanced Transputer Module for Real-Time Image Processing," *Third International Conference on Image Processing*, 1989, pp. 131-135.

Shah, "Multimedia on the Internet," *The Twentieth Annual International Computer Software & Applications Conferences*, COMPSAC '96, Aug. 21-23, 1996, p. 150.

Shepherd et al., "Quality-of-Service Support for Multimedia Applications," *Multimedia*, Fall 1996, vol. 3, No. 3, pp. 78-82.

Sriskanthan et al., "A Real-Time PC-Based Video Phone System on ISDN/Lan," *IEEE Transactions on Consumer Electronics*, May 1995, vol. 41, No. 2, pp. 332-342.

Stirpe et al., "Application Migration to Reserved Bandwidth Networks," *Multimedia Computing and Networking 1995*, Feb. 1995, vol. 2417, pp. 428-434.

Tamitani et al., "An Encoder/Decoder Chip Set for the MPEG Video Standard," *IEEE International Conference on Acoustics, Speech and Signal Processing*, Mar. 23-26, 1992, pp. 661-664.

The Motorola MCD212 Video Decoder and System Controller ("MCD212")(as described in the Advance Information manual, published in the U.S. Aug. 1995, at MOT-S 723153-723240).

Tiwari et al., "A Parallel MPEG-2 Video Encoder with Look-Ahead Rate Control," *The 1996 IEEE International Conference on Acoustics, Speech, and signal Processing Conference*, May 7-10, 1996, pp. 1994-1997.

Tobagi et al., "Streaming RAID—A Disk Array Management System for Video Files," *ACM Multimedia 93*, Aug. 1-6, 1993, pp. 393-400.

Tsang et al., "A VLSI Architecture for a Real-Time Code Book Generator and Encoder of a Vector Quantizer," *IEEE Transactions on a Joint Publication of IEEE Circuits and Systems Society, the IEEE Computer Society, the IEEE Solid-State Circuits Council*, Sep. 1994, vol. 2, No. 3, pp. 360-364.

Undy et al., "A low-cost graphics and multimedia workstation chip set," *IEEE Micro*, vol. 14, No. 2, Apr. 1994, pp. 10-22.

Uramoto et al., "An MPEG2 Video Decoder LSI with Hierarchical Control Mechanism," *IEEE 1997 Custom Integrated Circuits Conference*, Apr. 26, 1995, pp. 1697-1708.

U.S. District Court, Eastern District of Texas Live (Sherman), Civil Docket for Case #: 4:03-cv-00276-LED, *STMicroelectronics, Inc.*, Plaintiff v. *Motorola, Inc., and Freescale Semiconductor, Inc.*, Defendants, Counterclaim Plaintiffs v. *STMicroelectronics N.V., and STMicroelectronics, Inc.*, Counterclaim Defendants, date filed Jul. 18, 2003, 47 pages.

Verscheure et al., "Perceptual Video Quality and Activity Metrics: Optimization of Video Service Based on MPEG-2 Encoding," *Multimedia Telecommunications and Applications*, Nov. 1996, pp. 249-265.

Video Electronics Standards Association, "VESA Unified Memory Architecture Hardware Specifications Proposal," Version: 1.0p, pp. 1-38, Oct. 31, 1995.

Video Electronics Standards Association, VESA Unified Memory Architecture VESA BIOS Extensions (VUMA-SBE Proposal), Version 1.0p, pp. 1-26, Nov. 1, 1995.

Vogel et al., "Distributed Multimedia and QOS: A Survey," *Multimedia*, Summer 1995, vol. 2, No. 2, pp. 10-19.

Williams et al., "A Programmable Solution for Standard Video Compression," in *IEEE Computer Society Press*, Thirty-Seventh IEEE Computer Society International Conference, San Francisco, CA, Feb. 24-28, 1992, pp. 47-50.

Winzker et al., "Architecture and Memory Requirements for Stand-Alone and Hierarchical MPEG2 HDTV-Decoders with Synchronous DRAMs," *IEEE International Symposium on Circuits and Systems*, Apr. 30-May 3, 1995, pp. 609-612.

(56) References Cited

OTHER PUBLICATIONS

Wolfe et al., "Design Methodology for Programmable Video Signal Processors," *Multimedia Hardware Architectures 1997*, Feb. 12-13, 1997, vol. 3021, pp. 26-31.
Wolfe et al., "Concepts for Resource Reservation in Advance," *Multimedia Tools and Applications*, 1997, pp. 255-278.
Wong et al., "The H-Bus: A Media Acquisition Bus Optimized for Multiple Streams," *Multimedia Hardware Architectures 1997*, Feb. 12-13, 1997, vol. 3021, pp. 40-50.
Wrege et al., "Video Traffic Characterization for Multimedia Networks with a Deterministic Service," *IEEE Inforcom '96*, Mar. 1996, vol. 2, pp. 537-544.
Wu et al., "A Function-Pipelined Architecture and VLSI Chip for MPEG Video Image Coding," *IEEE Transactions on Consumer Electronics*, Nov. 1995, vol. 41, No. 4, pp. 1127-1137.
Yamada et al., "Real-time MPEG2 Encoding and Decoding with a Dual-Issue RISC Processor," *Proceedings of the IEEE 1997 Custom Integrated Circuits Conference*, May 5-8, 1997, pp. 225-228.
Yamazaki et al., "ATM Networking and Video-Coding Techniques for QOS Control in B-ISDN," *IEEE Transactions on Circuits and Systems for Video Technology*, Jun. 1993, vol. 3, No. 3, pp. 175-181.
Yoshimoto et al., "ULSI Realization of MPEG2 Realtime Video Encoder and Decoder—An Overview," *IEICE Trans. Electron*, May 23, 1995, vol. E78-C, No. 12, pp. 1668-1681.
Yu et al., "Resource Management Issues of a Video Server," *Multimedia Storage and Archiving Systems*, Nov. 18-19, 1996, vol. 2916, pp. 290-300.
Zahir et al., "VBR MPEG-2 Encoded Video Over Broadband Network," *Proceedings of SPIE*, Nov. 3-5, 1997, vol. 3231, pp. 372-381.
Zhang et al., "Red-VBR: A New Approach to Support Delay-Sensitive VBR Video in Packet-Switched Networks," *Network and Operating System Support for Digital Audio and Video*, Apr. 19-21, 1995, pp. 258-272.
Hsing, "The Challenge of VLSI Technology to Low-Bit Rate Video," VLSI Technology, Systems and Applications, 1989. Proceedings of Technical Papers. 1989 International Symposium on May 17-19, 1989, pp. 164-168.

\* cited by examiner

ELECTRONIC SYSTEM AND METHOD FOR SELECTIVELY ALLOWING ACCESS TO A SHARED MEMORY

CROSS-REFERENCE TO RELATED APPLICATIONS

This application is a continuation of U.S. patent application Ser. No. 13/239,200, now allowed; which is a continuation of U.S. Pat. No. 8,054,315, issued Nov. 8, 2011; which is a continuation of U.S. Pat. No. 7,898,548, issued Mar. 1, 2011; which is a continuation of U.S. Pat. No. 7,777,753, issued Aug. 17, 2010; which is a continuation of U.S. Pat. No. 7,542,045, issued Jun. 2, 2009; which is a continuation of U.S. Pat. No. 7,321,368, issued Jan. 22, 2008; which is a continuation of U.S. Pat. No. 6,427,194, issued Jul. 30, 2002; which is a continuation of U.S. Pat. No. 6,058,459, issued May 2, 2000. All of the U.S. patents, U.S. patent application publications, U.S. patent applications, foreign patents, foreign patent applications and non-patent publications referred to in this specification and/or listed in the Application Data Sheet, are incorporated herein by reference, in their entirety.

CROSS-REFERENCE TO OTHER RELATED APPLICATIONS

The present application contains some text and drawings in common with U.S. patent application Ser. No. 08/702,911, filed Aug. 26, 1996, and issued Sep. 22, 1998 as U.S. Pat. No. 5,812,789, entitled: "VIDEO AND/OR AUDIO DECOMPRESSION AND/OR COMPRESSION DEVICE THAT SHARES A MEMORY INTERFACE" by Raul Z. Diaz and Jefferson E. Owen, which had the same effective filing date and ownership as the present application, and to that extent is related to the present application, which is incorporated herein by reference.

BACKGROUND

The present invention relates to the field of electronic systems having a video and/or audio decompression and/or compression device, and is more specifically directed to sharing a memory interface between a video and/or audio decompression and/or compression device and another device contained in the electronic system.

The size of a digital representation of uncompressed video images is dependent on the resolution and color depth of the image. A movie composed of a sequence of such images, and the audio signals that go along with them, quickly become large enough so that, uncompressed, such a movie typically cannot fit entirely onto a conventional recording medium such as a Compact Disc (CD). It is now also typically prohibitively expensive to transmit such a movie uncompressed.

It is therefore advantageous to compress video and audio sequences before they are transmitted or stored. A great deal of effort is being expended to develop systems to compress these sequences. Several coding standards currently in use are based on the discrete cosine transfer algorithm including MPEG-1, MPEG-2, H.261, and H.263. (MPEG stands for "Motion Picture Expert Group", a committee of the International Organization for Standardization, also known as the International Standards Organization, or ISO.) The MPEG-1, MPEG-2, H.261, and H.263 standards are decompression protocols that describe how an encoded bitstream is to be decoded. The encoding can be done in any manner, as long as the resulting bitstream complies with the standard.

Video and/or audio compression devices (hereinafter "encoders") are used to encode the video and/or audio sequence before it is transmitted or stored. The resulting bitstream is decoded by a video and/or audio decompression device (hereinafter "decoder") before the video and/or audio sequence is displayed. However, a bitstream can only be decoded by a decoder if it complies with the standard used by the decoder. To be able to decode the bitstream on a large number of systems, it is advantageous to encode the video and/or audio sequences in compliance with a well accepted decompression standard. The MPEG standards are currently well accepted standards for one-way communication. H-261, and H.263 are currently well accepted standards for video telephony.

Once decoded, the images can be displayed on an electronic system dedicated to displaying video and audio, such as television or a Digital Video Disk (DVD) player, or on electronic systems where image display is just one feature of the system, such as a computer. A decoder needs to be added to these systems to allow them to display compressed sequences, such as received images and associated audio, or ones taken from a storage device. An encoder needs to be added to allow the system to compress video and/or audio sequences, to be transmitted or stored. Both need to be added for two-way communication such as video telephony.

A typical decoder, such as an MPEG decoder 10 shown in FIG. 1a, contains video decoding circuit 12, audio decoding circuit 14, a microcontroller 16, and a memory interface 18. The decoder can also contain other circuitry depending on the electronic system in which the decoder is designed to operate. For example, when the decoder is designed to operate in a typical television, it will also contain an on-screen display (OSD) circuit.

FIG. 1b shows a better decoder architecture, used in the STi3520 and STi3520A MPEG Audio/MPEG-2 Video Integrated Decoder manufactured by ST Microelectronics, Inc., Carrollton, Tex. The decoder has a register interface 20 instead of a microcontroller. The register interface 20 is coupled to an external microcontroller 24. The use of a register interface 20 makes it possible to tailor the decoder 10 to the specific hardware with which the decoder 10 interfaces, or to change its operation without having to replace the decoder by just reprogramming the register interface. It also allows the user to replace the microcontroller 24, to upgrade or tailor the microcontroller 24 to a specific use, by just replacing the microcontroller and reprogramming the register interface 20, without having to replace the decoder 10.

The memory interface 18 is coupled to a memory 22. A typical MPEG decoder 10 requires 16 Mbits of memory to operate in the Main Profile at Main Level mode (MP at ML). This typically means that the decoder requires a 2 Mbyte memory. Memory 22 is dedicated to the MPEG decoder 10 and increases the price of adding a decoder 10 to the electronic system. In current technology, the cost of this additional dedicated memory 22 can be a significant percentage of the cost of the decoder.

An encoder also requires a memory interface 18 and dedicated memory. Adding the encoder to an electronic system again increases the price of the system by both the price of the encoder and its dedicated memory.

FIG. 1c shows a conventional decoder inserted in a computer architecture. A conventional computer generally includes a peripheral bus 170 to connect several necessary or optional components, such as a hard disk, a screen, etc. These peripherals are connected to bus 170 via interfaces (e.g., a display adapter 120 for the screen) which are provided directly on the computer's motherboard or on removable boards.

A Central Processing Unit (CPU) 152 communicates with bus 170 through an interface circuit 146 enabling a main memory 168 of the computer to be shared between CPU 152 and peripherals of bus 170 which might require it.

The decoder 10 is connected as a master peripheral to bus 170, that is, it generates data transfers on this bus without involving CPU 152. The decoder receives coded or compressed data CD from a source peripheral 122, such as a hard disk or a compact disk read only memory (CD-ROM), and supplies decoded images to display adapter 120. Recent display adapters make it possible to directly process the "YUV" (luminance and chrominance) image data normally supplied by a decoder, while a display adapter is normally designed to process "RGB" (red, green, blue) image information supplied by CPU 152.

Display adapter 120 uses memory 12-1 for storing the image under display, which comes from the CPU 152 or from the decoder 10. A conventional decoder 10 also uses dedicated memory 22. This memory is typically divided into three image areas or buffers M1 to M3 and a buffer CDB where the compressed data are stored before they are processed. The three image buffers respectively contain an image under decoding and two previously decoded images.

FIG. 1*d* illustrates the use of buffers M1 to M3 in the decoding of a sequence of images I0, P1, B2, B3, P4, B5, B6, P7. I stands for a so-called "intra" image, whose compressed data directly corresponds to the image. P stands for a so-called "predicted" image, the reconstruction of which uses pixel blocks (or macroblocks) of a previously decoded image. Finally, B stands for a so-called "bidirectional" image, the reconstruction of which uses macroblocks of two previously decoded images. The intra and predicted images are likely to be used to reconstruct subsequent predicted and bidirectional images, while the bidirectional images are not used again.

Images I0 and P1 are respectively stored in buffers M1 and M2 during their decoding. The filling and the emptying of a buffer in FIG. 1*d* are indicated by oblique lines. The decoding of image P1 uses macroblocks of image I0. Image I0, stored in buffer M1, is displayed during the decoding of image B2, this image B2 being stored in buffer M3. The decoding of image B2 uses macroblocks of images I0 and P1. Image B2 is displayed immediately after image I0. As the locations of buffer M3 become empty, they are filled by decoded information of image B3. The decoding of image B3 also uses macroblocks of images I0 and P1. Once image B3 is decoded, it is displayed immediately, while image P4 is decoded by using macroblocks of image P1. Image P4 is written over image I0 in buffer M1 since image I0 will no longer be used to decode subsequent images. After image B3, image P1 is displayed while buffer M3 receives image B5 under decoding. The decoding of image B5 uses macroblocks of images P1 and P4. Image P1 is kept in buffer M2 until the decoding of image B6, which also uses macroblocks of images P1 and P4, and so on.

Referring again to FIG. 1*c*, when any component needs access to the main memory 168 either to read from or write to the main memory 168, it generates a request which is placed on the bus 170. When the request is a write, the data to be written is also placed on the bus 170. The request is processed and the data is then either written to or read from the main memory 168. When data is read from the main memory 168, the data is now placed on the bus and goes to the component that requested the read.

There are typically many components in the computer systems that may require access to the main memory 168, and they are typically all coupled to the same bus 170, or possibly to several buses if there are not enough connectors on one bus to accommodate all of the peripherals. However, the addition of each bus is very expensive. Each request is typically processed according to a priority system. The priority system is typically based on the priority given to the device and the order in which the requests are received. Typically, the priority system is set up so no device monopolizes the bus, starving all of the other devices. Good practice suggest that no device on the bus require more than approximately 50% of the bus's bandwidth.

The minimum bandwidth required for the decoder 10 can be calculated based on the characteristics and desired operation of the decoder. These characteristics include the standard with which the bitstream is encoded to comply, whether the decoder is to operate in real time, to what extent frames are dropped, and how the images are stored. Additionally, the latency of the bus that couples the decoder to the memory should be considered.

If the decoder does not operate in real time, the decoded movie would stop periodically between images until the decoder can get access to the memory to process the next image. The movie may stop and wait quite often between images.

To reduce the minimum required bandwidth and still operate in real time, the decoder 10 may need to drop frames. If the decoder 10 regularly does not decode every frame, then it may not need to stop between images. However, this produces very poor continuity in the images. This is problematic with an image encoded to the MPEG-1 or MPEG-2 standards, or any standard that uses temporal compression. In temporal (inter-picture) compression, some of the images are decoded based on previous images and some based on previous and future images. Dropping an image on which the decoding of other images is based is unacceptable, and will result in many poor or even completely unrecognizable images.

The computer can also contain both a decoder and encoder to allow for video telephony, as described above. In this case, not operating in real time would mean that the length of time between the occurrence of an event such as speaking at one end of the conversation until the event is displayed at the other end of the conversation—is increased by the time both the encoder and then the decoder must wait to get access to the bus and the main memory. Not being able to operate in real time means that there would be gaps in the conversation until the equipment can catch up. This increases the time needed to have a video conference, and makes the conference uncomfortable for the participants.

One widely used solution to allow a component in a computer system to operate in real time is to give the component its own dedicated memory. Thus, as shown in FIG. 1*c*, the decoder 10 can be given its own dedicated memory 22, with a dedicated bus 26 to connect the decoder 10 to its memory 22. The dedicated memory 22 significantly increases the cost of adding a decoder 10 to the computer. A disadvantage of a computer equipped with a conventional decoder is that it has a non-negligible amount of memory which is unused most of the time.

Indeed, memory 22 of the decoder is only used when decoded images are being viewed on the computer screen or need to be encoded, which amounts to only a fraction of the time spent on a computer. This memory—inaccessible to the other peripherals or to the CPU—has a size of 512 Kbytes in an MPEG-1 decoder and Mbytes in an MPEG-2 decoder.

Further, this memory is oversized, since it is obtained by using currently available memory components.

SUMMARY OF THE INVENTION

The present application discloses an electronic system that contains a first device and video and/or audio decompression and/or compression device capable of operating in real time. Both the first device and the video and/or audio decompression and/or compression device require access to a memory. The video and/or audio decompression and/or compression device shares the memory with the first device. The two devices are coupled to the memory through a fast bus having a bandwidth of at least the minimum bandwidth needed for the video and/or audio decompression and/or compression device to operate in real time.

In one preferred embodiment of the invention the two devices share an arbiter. The arbiter and Direct Memory Access (DMA) engines of the video and/or audio decompression and/or compression device and of the first device are configured to arbitrate between the two devices when one of them is requesting access to the memory. This allows both the video and/or audio decompression and/or compression device and the first device to share the memory.

When the video and/or audio decompression and/or compression device used in an electronic system, such as a computer, already containing a device that has a memory the video and/or audio decompression and/or compression device can share that memory, and the memory of the video and/or audio decompression and/or compression device can be eliminated. Eliminating the memory greatly reduces the cost of adding the video and/or audio decompression and/or compression device to the electronic system.

The decoder memory is part of the main memory of the computer. The computer should have a fast bus (such as a memory bus, a PCI—"Peripheral Component Interconnect"—bus, a VLB—"VESA (Video Electronics Standards Association) Local Bus", or an AGP—"Advanced Graphics Port"—bus, or any bus having a bandwidth sufficient to allow the system to operate in real time) which will accept high image rates between the decoder, the main memory and the display adapter.

According to an embodiment of the present invention, the decoder directly supplies a display adapter of the screen with an image under decoding which is not used to decode a subsequent image.

According to an embodiment of the present invention, the main memory stores predicted images which are obtained from a single preceding image and also stores intra images which are not obtained from a preceding image. The images directly supplied to the display adapter are bidirectional images obtained from two preceding intra or predicted images.

According to an embodiment of the present invention, the decoder is disposed on the computer's motherboard.

An advantage of the present invention is the significant cost reduction due to the fact that the video and/or audio decompression and/or compression device does not need its own dedicated memory but can share a memory with another device and still operate in real time.

A further advantage of the present invention is that the video and/or audio decompression and/or compression device can share the memory with a device without being integrated into this device, allowing the first device to be a standard device with some adjustments made to its memory interface.

Other advantages and objects of the invention will be apparent to those of ordinary skill in the art having reference to the following specification together with the drawings.

DETAILED DESCRIPTION OF THE PREFERRED EMBODIMENT

Figure 2:
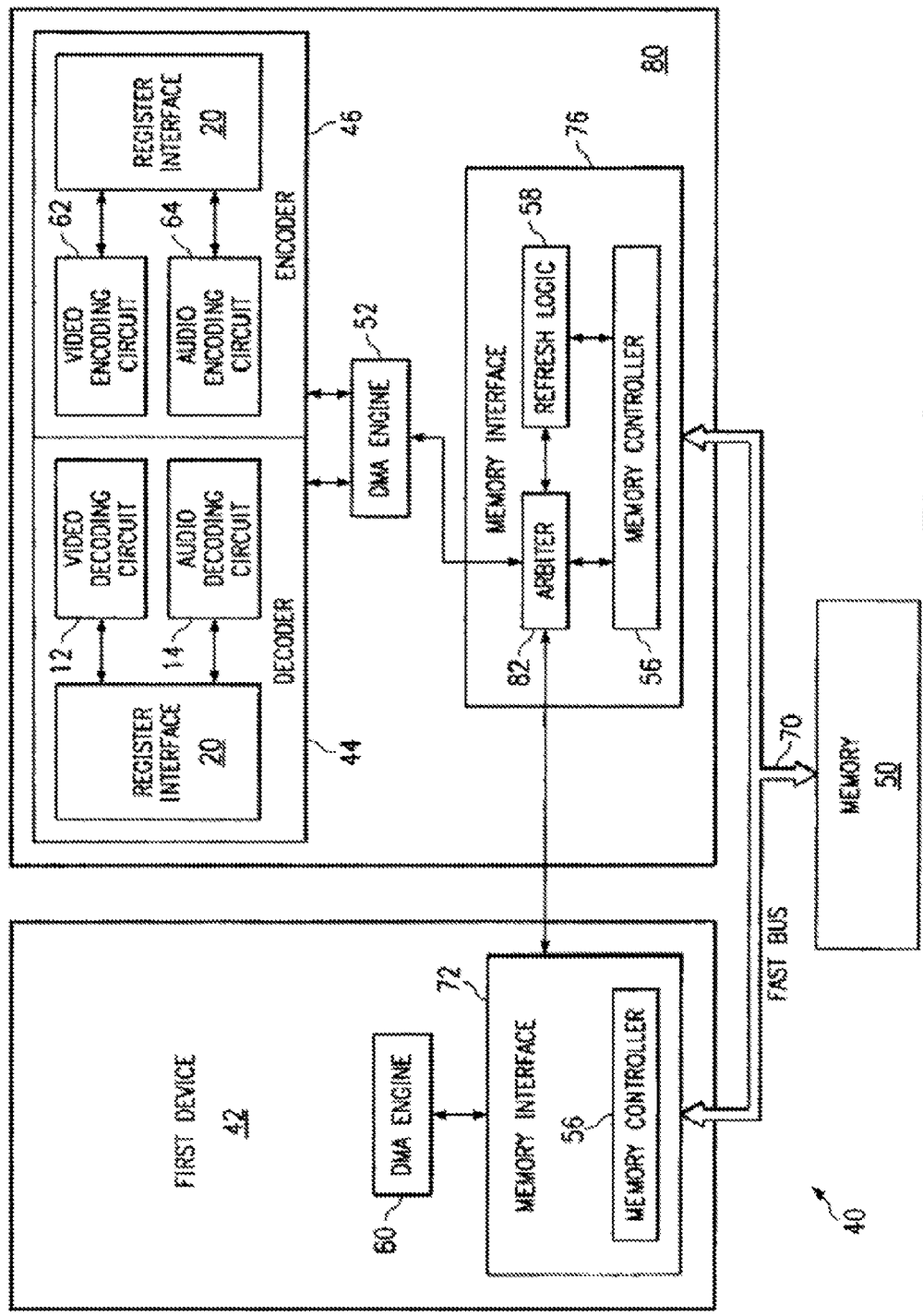
FIG. 2 is an electrical diagram, in block form, of an electronic system containing a device having a memory interface and an encoder and decoder.

FIG. 2 shows an electronic system 40 containing a first device 42 having access to a memory 50, and a decoder 44 and encoder 46, having access to the same memory 50. First device 42 can be a processor, a core logic chipset, a graphics accelerator, or any other device that requires access to the memory 50, and either contains or is coupled to a memory interface. In the preferred embodiment of the invention, electronic system 40 contains a first device 42, a decoder 44, an encoder 46, and a memory 50, although, either the decoder 44 or encoder 46 can be used in the video and/or audio decompression and/or compression device 80 without the other. For ease of reference, a video and/or audio decompression and/or compression device 80 will hereinafter be referred to as decoder/encoder 80. The decoder/encoder 80 may be a single device, or a cell in an integrated circuit; or it may be two separate devices, or cells in an integrated circuit. In the preferred embodiment of the invention, the first device 42, decoder/encoder 80, are on one integrated circuit, however, they can be on separate integrated circuits in any combination.

The decoder 44 includes a video decoding circuit 12 and an audio decoding circuit 14, both coupled to a register interface 20. The decoder 44 can be either a video and audio decoder, just a video encoder, or just an audio decoder. If the decoder 44 is just a video decoder, it does not contain the audio decoding circuitry 14. The audio decoding can be performed by a separate audio coder-decoder (codec) coupled to the first device 42, or through software. In the preferred embodiment of the invention, when the decoder/encoder 80 is in a system containing a processor and is coupled to the processor, the audio decoding is performed in software. This frees up space on the die without causing significant delay in the decoding. If the audio decoding is performed in software, the processor should preferably operate at a speed to allow the audio decoding to be performed in real time without starving other components of the system that may need to utilize the processor. For example, current software to perform AC-3 audio decoding takes up approximately 40% of the bandwidth of a 133 MHz Pentium. The encoder 46 includes a video encoding circuit 62 and an audio encoding circuit 64, both coupled to a register interface 20. The encoder 46 can be either a video and audio encoder, just a video encoder, or just an audio encoder. If the encoder 46 is just a video encoder, it does not contain the audio encoding circuitry 64. The audio encoding can be performed by a separate audio codec coupled to the first device 42, or through software. In the preferred embodiment of the invention, when the decoder/encoder 80 is in a system containing a processor and is coupled to the processor, the audio encoding is performed in software, presenting the same advantages of freeing up space on the die without causing significant delay in the encoding, as in the case of decoding discussed above. The register interfaces 20 of the decoder 44 and encoder 46 are coupled to a processor.

The decoder 44 and encoder 46 are coupled to the Direct Memory Access (DMA) engine 52. The decoder and encoder can be coupled to the same DMA engine as shown in FIG. 2, or each can have its own DMA engine, or share a DMA engine with another device. When the decoder/encoder 80 are two separate devices or cells, decoder 44 and encoder 46 can still be coupled to one DMA engine 52. When the decoder/encoder is one device or is one cell on an integrated circuit, the DMA engine 52 can be part of the decoder/encoder 80, as shown in FIG. 2. The DMA engine 52 is coupled to the arbiter 82 of the memory interface 76. The arbiter 82 is preferably monolithically integrated into the memory interface 76 of the decoder or into the memory interface 72 of the first device. However, the arbiter 82 can be a separate cell or device coupled to the memory interfaces 76, 72 of the decoder/encoder 80 and the first device 42. The arbiter 82 is also coupled to the refresh logic 58 and the memory controller 56 of the device into which it is monolithically integrated. The refresh logic 58, like the arbiter 82, can be monolithically integrated into the memory interface 76 of the decoder, into the memory interface 72 of the first device, or can be a separate cell or device coupled to the arbiter 82.

The first device 42 also contains a memory interface 72 and a DMA engine 60. The DMA engine 60 of the first device 42 is coupled to the memory interface 72 of the first device 72.

Both memory interfaces 72 and 76 are coupled to a memory 50. The memory controllers 56 are the control logic that generates the address the memory interfaces 72, 76 access in the memory 50 and the timing of the burst cycles.

In current technology, memory 50 is typically a Dynamic Random Access Memory (DRAM). However, other types of memory can be used. The refresh logic 58 is needed to refresh the DRAM. However, as is known in the art, if a different memory is used, the refresh logic 58 may not be needed and can be eliminated.

The decoder/encoder 80 is coupled to the memory 50 through devices, typically a bus 70, that have a bandwidth greater than the bandwidth required for the decoder/encoder 80 to operate in real time. The minimum bandwidth required for the decoder/encoder 80 can be calculated based on the characteristics and desired operation of the decoder, including the standard with which the bitstream is encoded to comply, whether the decoder/encoder 80 is to operate in real time, to what extent frames are dropped, and which images are stored. Additionally, the latency of the bus 70 that couples the decoder/encoder 80 to the memory 50 should be considered.

A goal is to have the decoder/encoder 80 operate in real time without dropping so many frames that it becomes noticeable to the movie viewer. To operate in real time the decoder/encoder 80 should decode and/or encode images fast enough so that any delay in decoding and/or encoding cannot be detected by a human viewer. This means that the decoder/encoder 80 has a required bandwidth that allows the decoder/encoder 80 to operate fast enough to decode the entire image in the time between screen refreshes, typically 1/30 of a second, with the human viewer unable to detect any delay in the decoding and/or encoding. To operate in real time, the required bandwidth should be lower than the bandwidth of the bus. In order not to starve the other components on the bus, i.e., deny these components access to the memory for an amount of time that would interfere with their operation, this required bandwidth should be less than the entire bandwidth of the bus. Therefore, a fast bus 70 should be used. A fast bus 70 is any bus whose bandwidth is equal to or greater than the required bandwidth. In current technology, there are busses, including the Industry Standard Architecture (ISA) bus, whose bandwidth is significantly below the bandwidth required for this.

In the preferred embodiment of the invention, the decoder/encoder 80 is coupled to the memory 50 through a fast bus 70 that has a bandwidth of at least the bandwidth required for the decoder/encoder 80 to operate in real time, a threshold bandwidth. Preferably the fast bus 70 has a bandwidth of at least approximately twice the bandwidth required for the decoder/encoder 80 to operate in real time. In the preferred embodiment, the fast bus 70 is a memory bus, however, any bus having the required bandwidth can be used.

The decoder/encoder 80 only requires access to the memory during operation. Therefore, when there is no need to decode or encode, the first device 42 and any other devices sharing the memory 50 have exclusive access to the memory and can use the entire bandwidth of the fast bus 70.

In the preferred embodiment, even during decoding and encoding, the decoder/encoder 80 does not always use the entire required bandwidth. Since the fast bus 70 has a bandwidth a little less than twice the size of the required bandwidth, the decoder/encoder 80 uses at most 60% of the bandwidth of the fast bus 70.

The required bandwidth is determined based on the size and resolution of the image and the type of frame (I, P, or B). In the preferred embodiment the decoder/encoder typically will be using less than 40% of the bandwidth of the fast bus 70. This frees up the remaining bandwidth to be used by the other devices with which the decoder/encoder 80 is sharing the memory 50.

The decoder/encoder 80 can decode a bitstream formatted according to any one or a combination of standards. In the preferred embodiment of the invention, the decoder/encoder 80 is a multi-standard decoder/encoder capable of decoding and encoding sequences formatted to comply with several well accepted standards. This allows the decoder/encoder 80 to be able to decode a large number of video and/or audio sequences. The choices of which standards the decoder/encoder 80 is capable of decoding bitstreams formatted to, and of encoding sequences to comply with, are based on the desired cost, efficiency, and application of the decoder/encoder 80.

In the preferred embodiment, these standards are capable of both intrapicture compression and interpicture compression. In intrapicture compression the redundancy within the image is eliminated. In interpicture compression the redundancy between two images is eliminated, and only the difference information is transferred. This requires the decoder/encoder 80 to have access to the previous or future image that contains information needed to decode or encode the current image. These previous and/or future images need to be stored and then used to decode the current image. This is one of the reasons the decoder/encoder 80 requires access to the memory, and requires a large bandwidth. The MPEG-1 and MPEG-2 standards allow for decoding based on both previous images and/or future images. Therefore, for a decoder/encoder 80 capable of operating in real time to be able to comply with the MPEG-1 and MPEG-2 standards, it should be able to access two images—a previous and a future image—fast enough to decode the current image in the ⅟30 of a second between screen refreshes.

An MPEG environment is asymmetrical; there are much fewer encoders than decoders. The encoders are very difficult and expensive to manufacture, and the decoders are comparatively easy and cheap. This encourages many more decoders than encoders, with the encoders in centralized locations, and decoders available such that every end user can have a decoder. Therefore, there are many receivers but few transmitters.

For video telephony and teleconferencing, each end user must be able to both receive and transmit. H.261, and H.263 are currently well accepted standards for video telephony. An encoder that can encode sequences to comply with the H.261 and H.263 standards is less complicated, having a lower resolution and lower frame rate than an encoder that complies with the MPEG-1 or MPEG-2 standards, possibly making the quality of the decoded images somewhat lower than those from an encoder that complies with the MPEG-1 or MPEG-2 standards. Since it should be inexpensive and operate in real time, such an encoder is also less efficient than an encoder to encode sequences to comply with the MPEG-1 or MPEG-2 standards, meaning that the compression factor—which is the ratio between the source data rate and the encoded bitstream data rate—of such an encoder is lower for a given image quality than the compression factor of an MPEG encoder. However, because such an encoder is less complicated, it is much cheaper and faster than an encoder capable of complying with the MPEG-1 and/or MPEG-2 standards. This makes video telephony possible, since both a long delay in encoding the signal and a cost that is prohibitively expensive for many users is unacceptable in video telephony.

In the preferred embodiment, the decoder/encoder 80 is capable of decoding a bitstream formatted to comply with the MPEG-1, MPEG-2, H.261, and H.263 standards, and encoding a sequence to produce a bitstream to comply with the H.261, and H.263 standards. This allows the decoder/encoder 80 to be able to be used for video telephony. The encoding to comply with the H.261 and H.263 standards but not the MPEG-1 and MPEG-2 standards balances the desire to reduce the cost of transmission and storage by encoding to produce the highest compression factor and the desire to keep cost low enough to be able to mass market the device.

Figure 3:
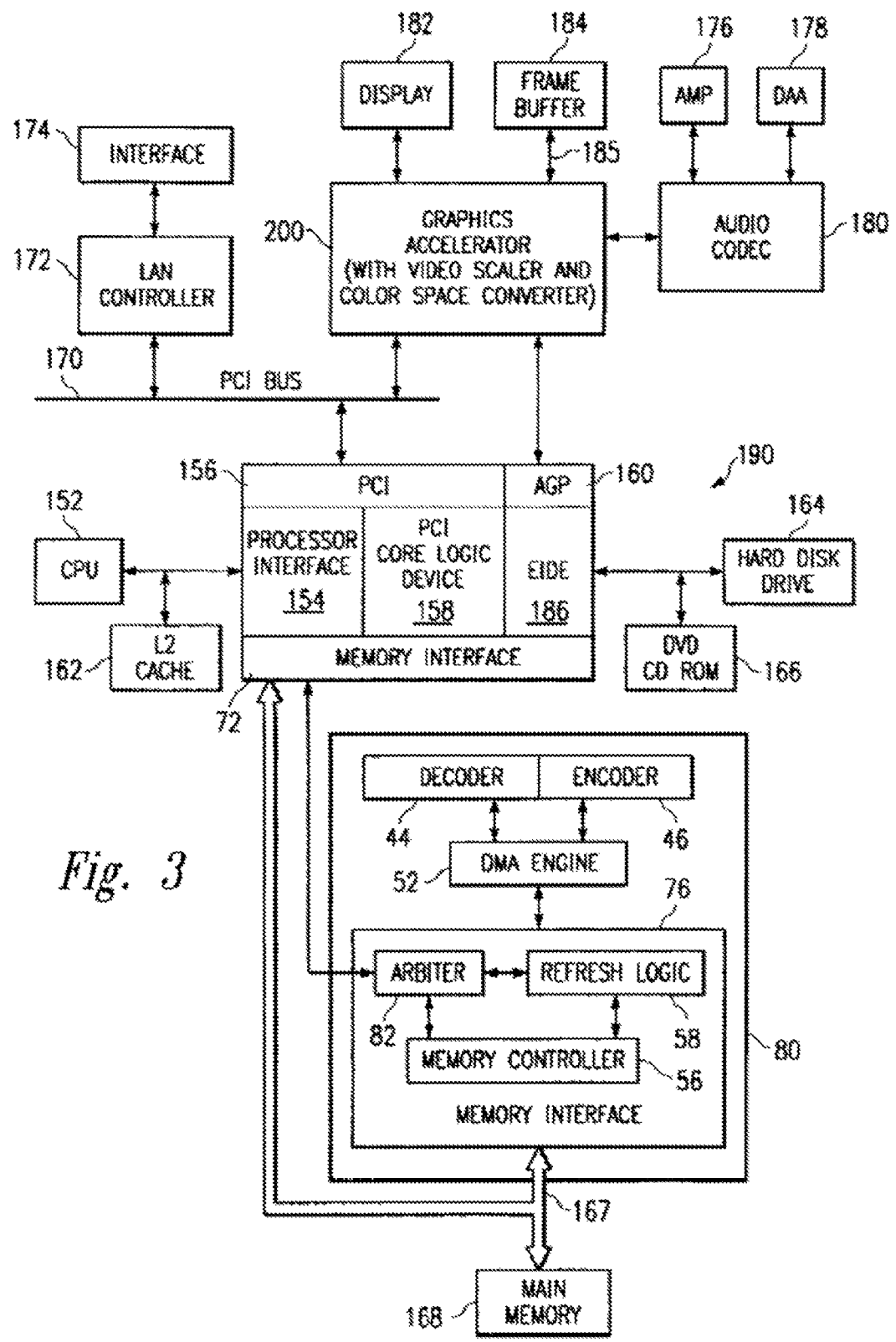
FIG. 3 is an electrical diagram, in block form, of a computer system containing a core logic chipset designed for the CPU to share a memory interface with an encoder and/or decoder according to one embodiment of the present invention.

FIG. 3 shows one embodiment of a computer where the decoder/encoder 80 is sharing a main memory 168 with a core logic chipset 190. The core logic chipset 190 can be any core logic chipset known in the art. In the embodiment shown in FIG. 3, the core logic chipset 190 is a Peripheral Component Interconnect (PCI) core logic chipset 190, which contains a PCI core logic device 158, the processor interface 154, a memory interface 72, and bus interface 156 for any system busses 170 to which it is coupled. The core logic chipset 190 can also contain an Accelerated Graphics Port (AGP) 160 if a graphics accelerator 200 is present in the computer, and an Enhanced Integrated Device Electronics (EIDE) interface 186. The core logic chipset 190 is coupled to a processor (Central Processing Unit or CPU) 152, peripherals such as a hard disk drive 164 and a Digital Versatile Disk (DVD) CD-ROM 166, a bus such as a PCI bus 170, the arbiter 82, and the main memory 168.

In this embodiment, the main memory 168 is the memory 50 to which the memory interfaces 72 and 76 are coupled. The main memory 168 is coupled to the memory interfaces 72 and 76 through a memory bus 167. In current technology the memory bus 167, which corresponds to the fast bus 70 for coupling the core logic chipset to the memory, is capable of having a bandwidth of approximately 400 Mbytes/s. This bandwidth is at least twice the bandwidth required for an optimized decoder/encoder 80, allowing the decoder/encoder 80 to operate in real time.

The core logic chipset 190 can also be coupled to cache memory 162 and a graphics accelerator 200 if one is present in the computer. The PCI bus 170 is also coupled to the graphics accelerator 200 and to other components, such as a Local-Area Network (LAN) controller 172. The graphics accelerator 200 is coupled to a display 182 and a frame buffer 184. The graphics accelerator can also be coupled to an audio codec 180 for decoding and/or encoding audio signals.

Figure 4:
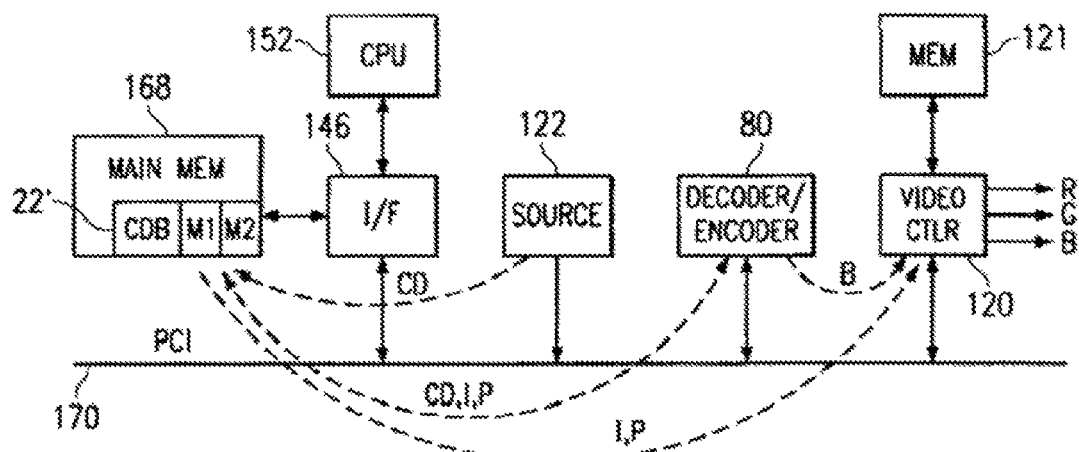
FIG. 4 is an electrical diagram, in block form, of a computer architecture including an encoder and/or decoder according to another embodiment of the present invention.

FIG. 4 shows another embodiment of a computer where the decoder/encoder 80 is sharing the main memory 168. In this embodiment, the main memory 168 corresponds to the shared memory 50 of FIG. 2. In FIG. 4, the decoder/encoder 80 according to the present invention is connected as a peripheral to a conventional computer equipped with a fast peripheral bus 170, for example, a PCI bus, although the bus can be VESA Local Bus (VLB), an Accelerated Graphics Port (AGP) bus, or any bus having the required bandwidth. In this embodiment, the fast peripheral bus 170 corresponds to the fast bus 70. As shown, the decoder/encoder 80 does not have a dedicated memory, but utilizes a region 22' of the main memory 168 of the computer.

Region 22' includes a Compressed Data Buffer (CDB), into which image source 122 writes the compressed image data, and two image buffers M1 and M2 associated with intra or predicted images. As will be seen hereafter, a buffer associated with bidirectional images is not required, these bidirectional images B being directly supplied to display adapter 120 as they are being decoded.

Thus, in the system of FIG. 4, compressed or coded data CD are transferred from image source 122 to buffer CDB of memory 168. These same compressed data are then transferred to the decoder/encoder 80 which, if they correspond to intra or predicted images, retransmits them in decoded form to buffers M1 and M2 of memory 168. In the case where the compressed data correspond to bidirectional images, the decoder/encoder 80 decodes these data and directly supplies display adapter 120 with the decoded data. The display adapter then supplies these data to a display device such as a screen. The intra or predicted images stored in buffers M1 and M2 are transferred to display adapter 120 at the appropriate time and are used in the decoding of subsequent predicted or bidirectional images.

With a decoder/encoder 80 according to the invention, the rates on peripheral bus 170 are particularly high, which is why a fast bus is needed. However, the rate required is substantially decreased due to the bidirectional images not being stored in main memory 168, but being directly sent to display adapter 120. According to the invention, the bandwidth used on a PCI bus is approximately 20% with an MPEG-1 decoder/encoder and approximately 80% with an MPEG-2 decoder/ encoder. These bandwidths correspond to worst case situations. The bandwidth in typical operation can be lower.

Figure 1A:
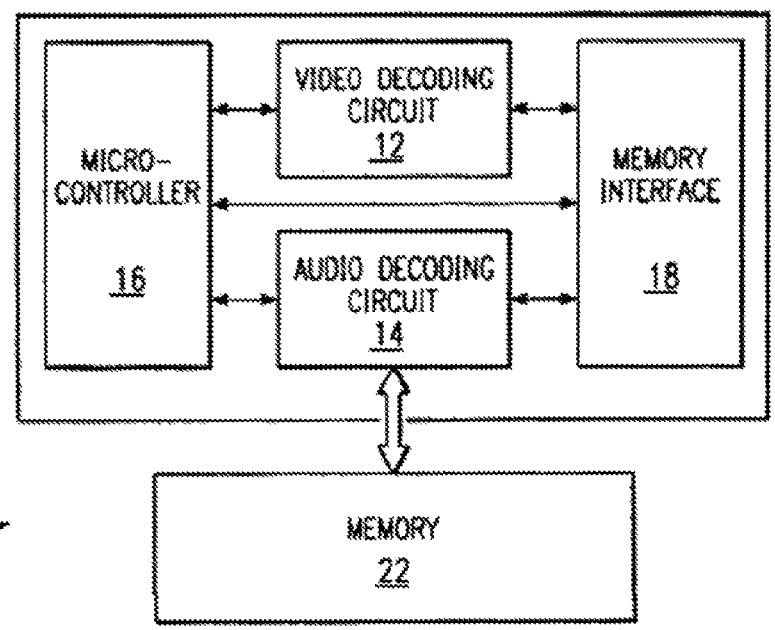
FIG. 1a and 1b are electrical diagrams, in block form, of prior art decoders.

Of course, the storage capacity of the main memory 168 available for other uses is reduced during the operation of the decoder/encoder 80 because the decoder/encoder 80 is using the memory region 22'. However, in this embodiment the size of region 22' is decreased from the size of the dedicated memory 22 used in the prior art (FIGS. 1a and 1c) by one image buffer. The memory region 22' is also only occupied while viewing video sequences. When the decoder/encoder is no longer used, memory region 22' can be freed at once for the other tasks.

The modifications to be made on the computer to use a decoder/encoder according to the invention primarily involve software changes and are within the capabilities of those skilled in the art, who will find the necessary information in the various standards relating to the computer. For the computer to be able to use its peripherals, it conventionally executes background programs called peripheral drivers, which translate specific addresses issued by the CPU or a master peripheral (such as the decoder/encoder 80) into addresses adapted to the variable configuration of the computer.

For example, a peripheral driver associated with the decoder/encoder according to the invention translates the fixed addresses issued by the decoder/encoder 80 to have access to its image memory into addresses corresponding to the physical location of region 22', this region being likely to be variably assigned by the operating system according to the occupancy of memory 168. Similarly, this peripheral driver answers requests issued by image source 122 to supply compressed data by transferring these data into buffer CDB of region 22'.

In an alternative embodiment the third image buffer M3 (FIG. 1c) remains in the memory region 22' used for the decoder/encoder 80. A conventional decoder/encoder should be able to be used in several applications, especially to supply television images. In the case of television, the images are supplied in interlaced form, that is, all the odd lines of an image are supplied prior to the even lines. An MPEG decoder generally reconstructs the images in progressive form, that is, it supplies the image lines consecutively. The third image buffer M3 is then necessary to store the bidirectional images in the order of arrival of the lines (in progressive form) and then reread this image in interlaced form. The third image buffer M3 may also be needed if there is a delay between when the images are decoded and when they can be viewed, requiring the images to be stored.

Figure 5:
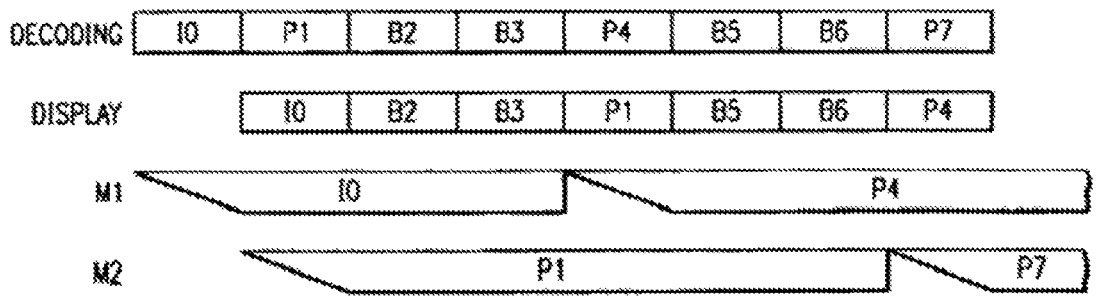
FIG. 5 illustrates the use of image buffers in the processing of an image sequence by an MPEG decoder according to the present invention.

FIG. 5 illustrates the use of memory region 22' in the decoding according to the invention of sequence 10, P1, B2, B3, P4, B5, B6, P7. Image I0 is stored in buffer M1 during its decoding. As the decoding and the storage in buffer M2 of image P1 begins, image I0 is displayed. The macroblocks used to decode image P1 are fetched from buffer M. Images B2 and B3 are displayed as they are being decoded, the macroblocks used for their decoding being fetched from buffers M1 and M2. Image P1 is displayed while image P4 is being decoded and stored in buffer M1 in the place of image I0. Image P1 is kept in buffer M2 until image B6 is decoded and displayed, and so on.

Figure 6:
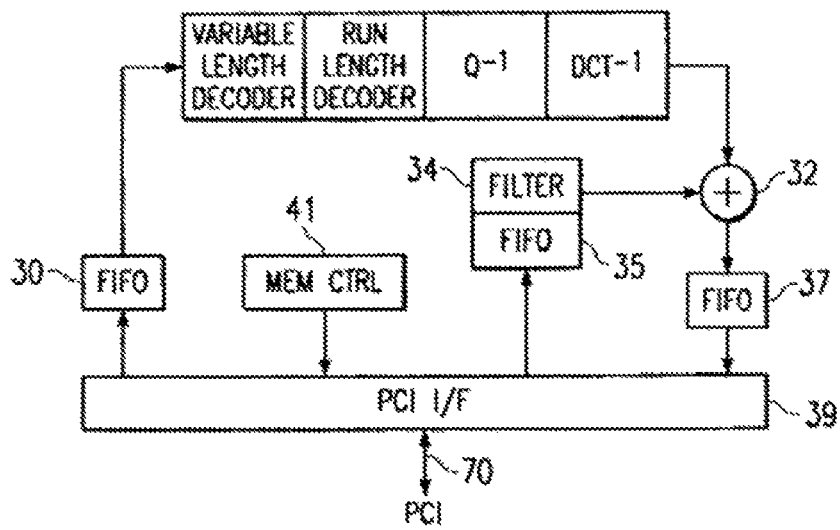
FIG. 6 is an electrical diagram, in block form, of an embodiment of an MPEG decoder architecture according to the present invention.

FIG. 6 shows an architecture of an MPEG decoder according to the invention. Like any conventional MPEG decoder, this decoder includes a Variable Length Decoder (VLD) receiving compressed data from a First-In, First-Out (FIFO) memory 30. The VLD is followed by a Run-Level Decoder (RLD), an inverse quantization circuit Q-1 and an inverse discrete cosine transform circuit DCT-1. The output of circuit DCT-1 is supplied to a first input of an adder 32, a second input of which receives macroblocks of a previously decoded image via a filter 34 and a FIFO 35. The decoded image data are supplied by the output of adder 32 and via a FIFO 37. FIFO 30 is supplied with compressed data from bus 10 via an interface circuit PCI I/F 39.

A decoder according to the invention differs from a conventional decoder in that the interface circuit 39 also connects FIFOs 35 and 37 to bus 170. A memory controller 41 calculates and supplies through bus 170 the addresses corresponding to the various exchanges required.

The management of the addresses of buffers M1 and M2 is similar to that performed by the memory controller of a conventional decoder, since these addresses are, according to the invention, translated according to the physical location of these buffers in memory 168 by a peripheral driver. Moreover, the memory controller of a decoder/encoder 80 according to the preferred embodiment of the invention is substantially simplified due to the absence of the third image buffer M3. The memory controller of a conventional decoder has to manage this buffer in a specific way to avoid a bidirectional image under decoding being written over a bidirectional image under display.

Figure 7:
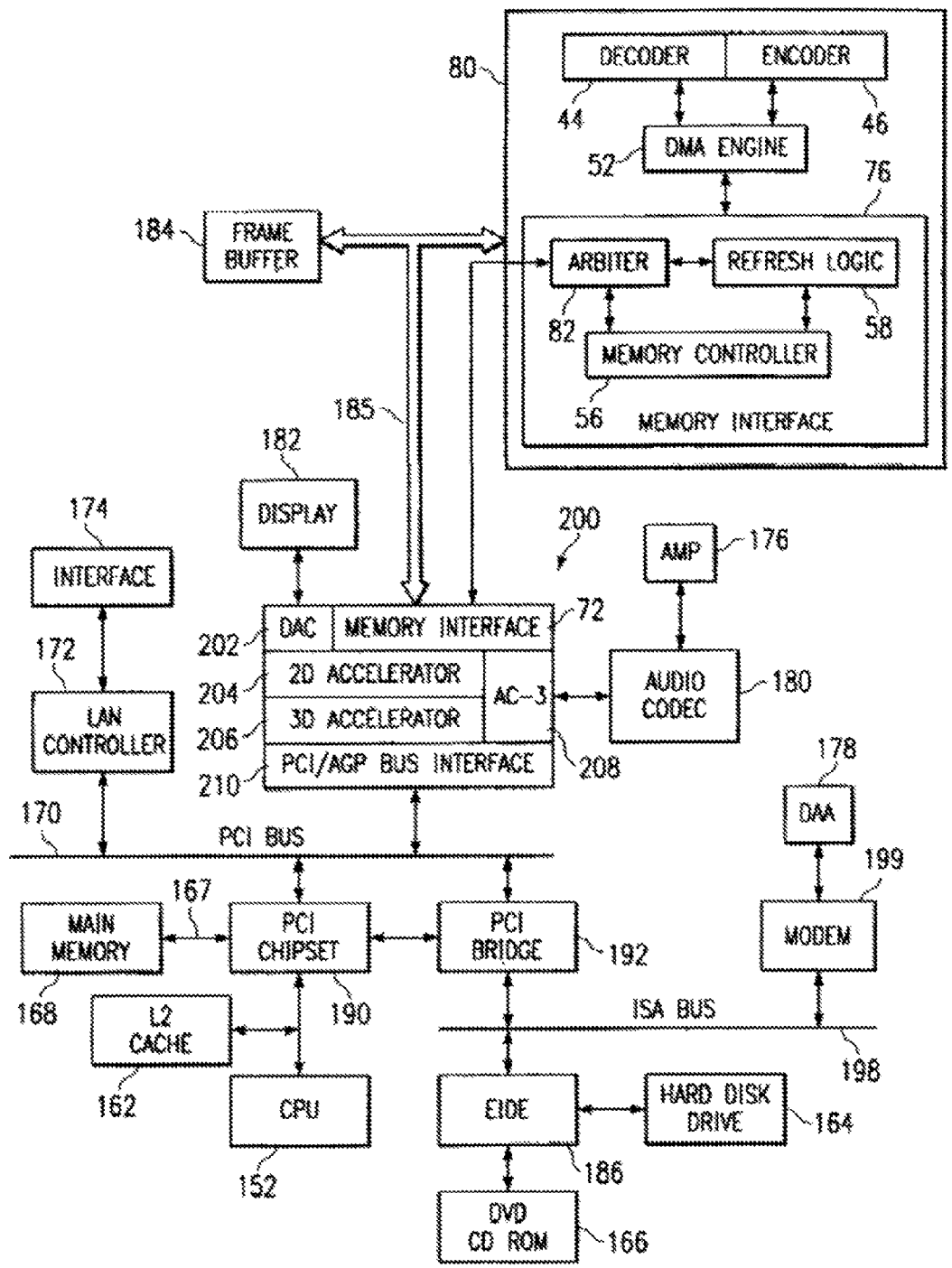
FIG. 7 is an electrical diagram, in block form, of a computer system containing a graphics accelerator designed to share a memory interface with an encoder and/or decoder.

FIG. 7 shows a computer where the decoder/encoder 80 is sharing a frame buffer 184 with a graphics accelerator 200. The graphics accelerator 200 can be any graphics accelerator known in the art. In the embodiment shown in FIG. 7, the graphics accelerator 200 contains a Two-Dimensional (2D) accelerator 204, a Three-Dimensional (3D) accelerator 206, a Digital to Analog Converter (DAC) 202, a memory interface 72, and bus interface 210 for any system busses 170 to which it is coupled. The graphics accelerator 200 can also contain an audio compressor/decompressor 208, here an AC-3 decoder. The graphics accelerator 200 is coupled to a display 182, and a frame buffer 184.

In this embodiment, the frame buffer 184 is the memory 50 to which the memory interfaces 72 and 76 are coupled. The frame buffer 184 is coupled to the memory interfaces 72 and 76 through a memory bus 185. In this embodiment, memory bus 185 corresponds to the fast bus 70. In current technology the memory bus 185 for coupling a graphics accelerator to a memory is capable of having a bandwidth of up to 400 Mbytes/s. This bandwidth is more that twice the bandwidth required for an optimized decoder/encoder 80. This allows the decoder/encoder 80 to operate in real time.

The graphics accelerator 200 can also be coupled to an audio codec 180 for decoding and/or encoding audio signals. The PCI bus 170 is also coupled to a chipset 190, and to other components, such as a LAN controller 172. In the present embodiment the chipset is a PCI chipset, although it can be any conventional chipset. The chipset 190 is coupled to a processor (CPU) 152, main memory 168, and a PCI bridge 192. The PCI bridge bridges between the PCI bus 170 and the ISA bus 198. The ISA bus 198 is coupled to peripherals, such as a modem 199 and to an EIDE interface 186, which is coupled to other peripherals, such as a hard disk drive 164 and a DVD CD-ROM 166, although, if the peripherals are compatible to the PCI bus the EIDE interface 186 can be integrated into the PCI chipset 190 and the peripherals 164 and 166 can be coupled directly to the PCI chipset, eliminating the PCI bridge 192 and the ISA bus 198.

Referring to FIG. 2, the operation of the arbiter 82 during a memory request will now be described. During operation the decoder/encoder 80, the first device 42, and the refresh logic 58, if it is present, request access to the memory through the arbiter 82. There may also be other devices that request access to the memory 50 through this arbiter. The arbiter 82 determines which of the devices gets access to the memory 50. The decoder/encoder gets access to the memory in the first time interval, and the first device gets access to the memory in the second time interval. The Direct Memory Access (DMA) engine 52 of the decoder/encoder 80 determines the priority of the decoder/encoder 80 for access to the memory 50 and of the burst length when the decoder/encoder 80 has access to the memory. The DMA engine 60 of the first device determines its priority for access to the memory 50 and the burst length when the first device 42 has access to the memory.

The decoder/encoder 80 or one of the other devices generates a request to access the memory 50. The request will be transferred to the arbiter 82. The state of the arbiter 82 is determined. The arbiter typically has three states. The first state is idle when there is no device accessing the memory and there are no requests to access the memory. The second state is busy when there is a device accessing the memory and there is no other request to access the memory. The third state is queue when there is a device accessing the memory and there is another request to access the memory.

It is also determined if two requests are issued simultaneously. This can be performed either before or after determining the state of the arbiter. Access to the memory is determined according to the following chart.

| Arbiter state | Simultaneous requests | Action |
| --- | --- | --- |
| Idle | Yes | One of the requests gets access to the memory based on the priority scheme, and the other request is queued. |
| Busy | Yes | Both requests are queued in an order based on the priority scheme. |
| Queue | Yes | Both requests are queued in an order based on the priority scheme. |
| Idle | No | The device gets access to the memory. |
| Busy | No | The request is queued. |
| Queue | No | The requests are queued in an order based on the priority scheme. |

The priority scheme can be any priority scheme that ensures that the decoder/encoder 80 gets access to the memory 50 often enough and for enough of a burst length to operate properly, yet not starve the other devices sharing the memory. The priority of the first device, device priority, and the priority of the decoder/encoder 80, decoder priority, are determined by the priority scheme. This can be accomplished in several ways.

To operate in real time, the decoder/encoder 80 has to decode an entire image in time to be able to display it the next time the screen is refreshed, which is typically every 1/30 of a second. The decoder/encoder 80 should get access to the memory to store and retrieve parts of this and/or of past and/or future images, depending on the decoding standard being used, often enough and for long enough burst lengths to be able to decode the entire image in the 1/30 of a second between screen refreshes.

There are many ways to do this. One way is to make the burst length of the first device and any other device like the screen refresh that shares the memory and memory interface (hereinafter sharing device) have short burst lengths, and to make sure that the same device is not the next device to get access to the memory when other devices have been waiting for a long time. Another way is to preempt the sharing device if its burst length exceeds a burst length threshold and again to make sure that the same device is not the next device to get access to the memory when other devices have been waiting for a long time. Preferably, when the preemption is used the sharing device would be preempted when its burst length exceeds 16 words. A third way is to limit the bandwidth available to the sharing devices. This way the decoder/encoder 80 always has enough bandwidth to operate in real time. Preferably the bandwidth of the sharing devices is limited only when the decoder/encoder 80 is operating. In the preferred embodiment a memory queue such as a FIFO in the decoder/encoder 80 generates an error signal when it falls below a data threshold. The error is sent to the CPU 152 and the CPU 152 can either shut down the system, drop an image frame or resume the decoding/encoding process.

There are also many ways to make sure that the same device is not the next device to get access to the memory when other devices have been waiting for a long time. This both ensures that the decoder/encoder 80 gets access to the memory 50 often enough, yet does not starve the other devices sharing the memory. One way to do this is to disallow back-to-back requests. Another is to have shifting priority, where a particular request starts with a lower priority when first made, and the priority increases with the length of time the request is in the queue, eventually reaching a priority above all of the other requests. In the preferred embodiment, the decoder/encoder 80 has a one-clock cycle delay between requests to allow a sharing device to generate a request between the decoder/encoder requests.

In the preferred embodiment of the invention, the burst length of the decoder/encoder is relatively short, approximately four to seventeen words. This allows the graphics accelerator more frequent access to the memory to ensure that the display is not disturbed by the sharing of the memory interface 48 and memory 50 when the decoder/encoder shares a memory with the graphics accelerator 200.

Figure 1B:
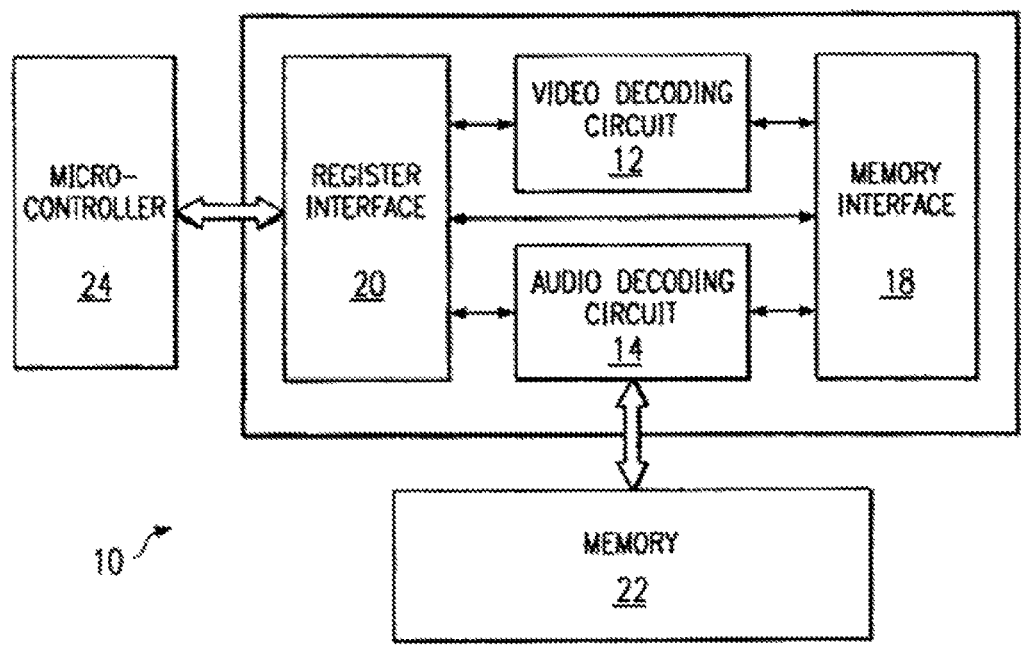
Figure 1C:
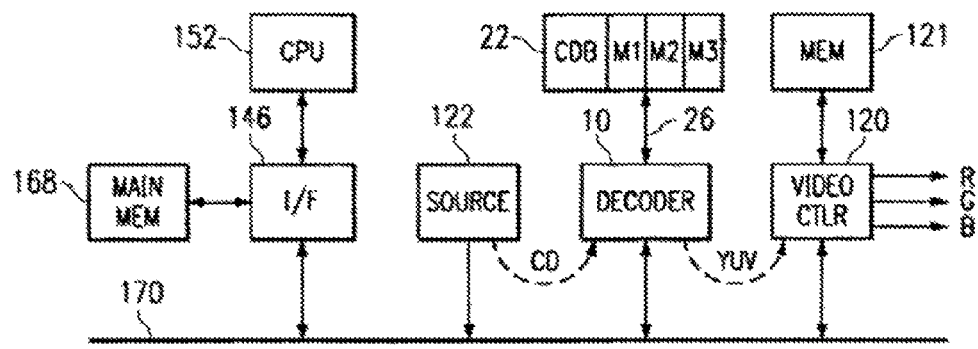
FIG. 1c is an electrical diagram, in block form, of a computer architecture including a conventional decoder.
Figure 1D:
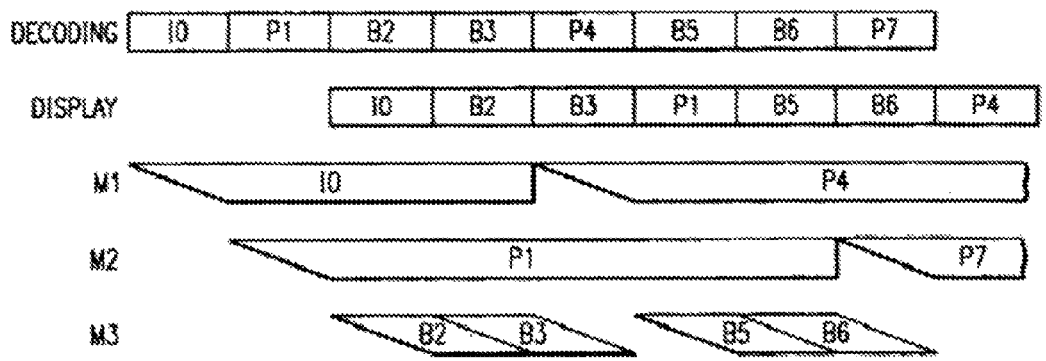
FIG. 1d, illustrates the use of image buffers in the processing of an image sequence by a conventional MPEG decoder.

An electronic system 40, shown in FIG. 2, containing the first device 42 coupled to the memory 50, the decoder/encoder 80 coupled to the same memory 50, where the decoder/encoder 80 shares the memory 50 with the first device 42 provides several advantages. Referring to FIG. 2 and FIG. 1b simultaneously, the decoder 44 and encoder 46 according to the preferred embodiment of the invention do not each need their own dedicated memory 22 that was necessary in the prior art for the decoder/encoder to operate in real time, resulting in significant reduction in the cost of the device. Allowing the decoder/encoder 80 to share the memory 50 with a first device 42 and to allow the decoder/encoder 80 to access the memory 50 through a fast bus 70 having a bandwidth of a least the bandwidth threshold permits the decoder/encoder to operate in real time. This reduces stops between images and the dropping of a significant number of frames to a point where both are practically eliminated. This produces better images and eliminates any discontinuities and delays present in the prior art.

Additionally, in the embodiment of the invention where the fast bus 70 is a system bus to which the decoder/encoder 80 is already coupled, the number of pins of the decoder/encoder 80 is considerably smaller than that of a conventional decoder. The decoder/encoder according to the invention only requires the signals of the peripheral bus 170 (49 signals for the PCI bus), while a conventional decoder further includes an interface with its dedicated memory 22, which is typically an external memory.

Thus, decoding in a computer can be performed according to the invention by means of a low-cost (due to the small number of pins) single integrated circuit, without the additional, costly, dedicated memory 22. This single integrated circuit can be directly placed on the computer motherboard for a low additional cost. Of course, the decoder/encoder according to the invention can be mounted, as is conventional, on an extension board to be connected to a bus.

A further advantage of the present invention is that the video and/or audio decompression and/or compression device can share memory with the first device without being integrated into the first device. This allows the first device to be a standard device with some adjustments made to its memory interface.

Further background on compression can be found in: International Organization for Standards, *Information Technology—Coding of Moving Pictures and Associated Audio for Digital Storage Media at up to About* 1.5 *Mbits/S*, Parts 1-6, International Organization for Standards; International Standards Organization, *Information Technology—Generic Coding of Moving Pictures and Associated Audio Information*, Parts 1-4, International Organization for Standards; Datasheet "STi3500A" Datasheet of SGS-THOMSON Microelectronics; STi3500A—Advanced Information for an MPEG Audio/MPEG-2 Video Integrated Decoder" (June 1995); Watkinson, John, *Compression in Video and Audio*, Focal Press, 1995; Minoli, Daniel, *Video Dialtone Technology*, McGraw-Hill, Inc., 1995. Further background on computer architecture can be found in Anderson, Don and Tom Shanley, *ISA System Architecture*, 3rd ed., John Swindle ed., MindShare Inc., Addison-Wesley Publishing Co., 1995. All of the above references are incorporated herein by reference.

While the invention has been specifically, described with reference to several preferred embodiments, it will be understood by those of ordinary skill in the prior art having reference to the current specification and drawings that various modifications may be made and various alternatives are possible therein without departing from the spirit and scope of the invention. For example: Although the memory is described as DRAM, other types of memories including read-only memories, Static Random Access Memories (SRAMs), or FIFOs may be used without departing from the scope of the invention.

Any conventional decoder including a decoder complying to the MPEG-1, MPEG-2, H.261, or H.261 standards, or any combination of them, or any other conventional standard can be used as the decoder/encoder.

We claim:

1. A computing device, comprising:
   a central processing unit (CPU);
   core logic coupled by a first bus to the CPU, the core logic having a first memory interface coupleable to a shared main memory;
   a cache memory coupled to the CPU by the first bus;
   a decoder/encoder coupleable to the shared main memory via a second memory interface;
   an arbiter configured to receive shared memory access requests from the CPU and the decoder/encoder, the arbiter configured to arbitrate access to the shared main memory; and
   a memory bus coupled to the first memory interface and the second memory interface, the memory bus configured to pass first data in real time between the shared main memory and the CPU via the first memory interface, the memory bus configured to pass second data in real time between the shared main memory and the decoder/encoder.

2. The computing device according to claim 1 wherein computing device is a computer.

3. The computing device according to claim 1 wherein the core logic comprises:
   a Peripheral Component Interconnect (PCI) core logic device.

4. The computing device according to claim 1 wherein the core logic comprises:
   an Accelerated Graphics Port (AGP); and
   an Enhanced Integrated Device Electronics (EIDE) interface.

5. The computing device according to claim 4, comprising:
   a hard disk drive; and
   an optical disk drive, wherein the hard disk drive and the optical disk drive are coupled to the core logic via the EIDE interface.

6. The computing device according to claim 1 wherein the memory bus is capable of having a bandwidth at least two times greater than the amount of data carried to the decoder/encoder when the decoder/encoder decodes in real time.

7. The computing device according to claim 6 wherein the memory bus is capable of carrying up to 400 Mbytes/s.

8. The computing device according to claim 1 wherein the arbiter is coupled to the second memory interface and the arbiter and second memory interface are integrated with the decoder/encoder.

9. The computing device according to claim 1 wherein the decoder/encoder includes a DMA engine coupled to the second memory interface, the DMA engine configured to control data bursts between the decoder/encoder and the shared main memory via the second memory interface.

10. The computing device according to claim 9 wherein the DMA engine controls priority of data bursts between the decoder/encoder and the shared main memory via the second memory interface.

11. The computing device according to claim 1, comprising:
    refresh logic coupled via a memory interface, the refresh logic configured to maintain the contents of the shared main memory.

12. The computing device according to claim 11 wherein the refresh logic, the arbiter, and the second memory interface are monolithically integrated into the decoder/encoder.

13. The computing device according to claim 4, comprising:
    a graphics accelerator coupled to the core logic via an Accelerated Graphics Port (AGP) bus and a Peripheral Component Interconnect (PCI) bus; and
    a local area network (LAN) controller coupled to the core logic via the PCI bus.

14. The computing device according to claim 13, comprising:
    a frame buffer coupled to the graphics accelerator via a frame buffer memory bus; and
    an audio codec coupled to the graphics accelerator.

15. The computing device according to claim 14 wherein the frame buffer memory bus is memory bus coupled to the first memory interface and the second memory interface.

16. The computing device according to claim 13 wherein the graphics accelerator is configured to perform video scaling and color space conversions.

17. The computing device according to claim 1 wherein the decoder/encoder is a cell in an integrated circuit and the CPU is a cell in the integrated circuit.

* * * * *